United States Patent [19]
Berthiaume et al.

[11] 3,746,111
[45] July 17, 1973

[54] SHORT SCALE FOR WEIGHING RAILWAY VEHICLES

[75] Inventors: Pierre P. Berthiaume, St. Laurent, Quebec; William Bowler, Pierrefonds, Quebec; George Robert Cass, Montreal, Quebec; Jan Schotman, La Prairie, Quebec; J. Frank Scott, Pierrefonds, Quebec; Jacques Thivierge, Beloeil, Quebec, all of Canada

[73] Assignee: Canadian National Railway Company, Quebec, Canada

[22] Filed: Sept. 7, 1971

[21] Appl. No.: 178,241

[52] U.S. Cl. ............................................. 177/163
[51] Int. Cl. ............................................. G01g 21/22
[58] Field of Search .................. 177/134, 136, 163, 177/210, 211

[56] References Cited
UNITED STATES PATENTS
3,421,593  1/1969  Buchman ...................... 177/163 X
3,153,460  10/1964  Raskin ............................ 177/163 X
3,092,195  6/1963  Von Petery ....................... 177/163

Primary Examiner—George H. Miller, Jr.
Attorney—Fetherstonhaugh & Co.

[57] ABSTRACT

A weighing apparatus for weighing a load moveable along at least one track rail such as a railroad car. A weighing apparatus according to the invention for weighing, for example, a railroad car includes a pair of parallel weigh rails supported from and longitudinally interposed in a gap in the track rail adjacent to the weigh rail, a splice bar assembly for retaining each weigh rail in longitudinal alignment with the track rail, and a strain gauge load cell interposed between the weigh rail and the assembly supporting the weigh rail, for providing a signal indicative of the weight on the weigh rail.

11 Claims, 5 Drawing Figures

Patented July 17, 1973 3,746,111

SHORT SCALE FOR WEIGHING RAILWAY VEHICLES

BACKGROUND OF THE INVENTION

This invention relates to an improved weighting apparatus of the type used for weighing moving vehicles constrained to a track, such vehicles including railroad freight cars.

Present railroad cars are being made longer and heavier, thus complicating weighing of the cars in the railroad yards and policing for overweight cars along the track lines. The normal weighing practice in hump yards has been to use the "down and hump" single draft weighing method, which comprises sending the car to be weighed over a hump and down an inclined approach to the weigh bridge which weighs the entire car at one time. However, the longer cars necessitate a longer weigh bridge, since it is desirable that regular humping operations not be disrupted during weighing. The weighbridges in these applications approach one hundred feet in length.

Double draft weighing is another weighing method presently in use. This method uses a shorter weigh bridge and only one truck of the railroad car is weighed at a time. The weight of the entire car is obtained by simply adding the individual truck weights. However, because of the increasing occurrence of three axle trucks on railroad cars, these double draft weigh bridges must still be quite long. For example, the conventional spacing between axles is five feet six inches, and thus approximately twelve feet is the minimum length for weighing a three axle truck. Therefore, double draft weigh bridges that are less than twelve feet long are not only restricted to weighing cars having two axle trucks, but are also restricted to weighing cars that move at a very slow speed.

Another use for weight bridges is the policing of overweight cars at selected locations along the railroad lines. Clearly a single draft weigh bridge of one hundred feet in length is not a practical solution because of the installation expense and the limited number of locations where such a bridge can be installed. The double draft weigh bridges currently in use have the disadvantage of requiring a relatively long and complex weigh bridge and a scale pit having a concrete foundation.

Thus, the need exists for a relatively accurate, inexpensive, easily installable and easily relocatable weighing apparatus. This apparatus can then be used at either a railroad yard or can be located in a remote section of the line, thereby allowing for the policing of over weight cars, axle overloading or uneven weight distribution.

There have been a number of attempts to fill this need, but most weighing apparatus installations still require a concrete foundation. The disadvantages of using concrete is that the installation of the weighing apparatus cannot be accomplished in a single day, there is an added expense in the construction of the foundation, and the scale is not easily relocatable. One weighing apparatus using concrete is described in U.S. Pat. No. 3,421,593 granted to M.J. Buchman. The design of the scale pit used in the Buchman weighing apparatus eliminates the need for concrete side walls, but it still requires a concrete base in order to provide the necessary rigidity to the load responsive means and support to the weigh rails.

SUMMARY OF THE INVENTION

It is an object of the present invention to provide an easily installable, inexpensive, and easily relocatable weighing apparatus for the weighing of stationary or moving railroad vehicles and other vehicles or objects moveable along a track.

An important advantage of the present invention is that an accurate weight is obtained without the incorporation of a concrete scale pit. Further, the structure of the present invention is less complex than other weighing apparatus.

Other features and advantages of the present invention will be set forth or be apparent from the description of a presently preferred embodiment found herein below.

The invention provides a weighing apparatus for weighing a load moveable along an elongate track rail, said elongate track rail including a first elongate track rail section and a second elongate track rail section longitudinally spaced therefrom and in longitudinal alignment therewith, said weighing apparatus comprising: a weigh rail interposable in said space in longitudinal alignment between said first and said second track rail sections; first means for supporting a first end of said weigh rail said first supporting means being supported by the end of the first track rail section adjacent to said first end of the weigh rail; second means for supporting the other end of said weigh rail, said second supporting means supported by the end of the second track rail section adjacent to said other end of the weigh rail; said weigh rail being supported by said first and second support means in the space between said track rail sections; means for retaining said weigh rail in longitudinal alignment with said track rail sections; and at least one weight responsive means responsive to the weight of the load on said weigh rail for providing a signal that is representative of the weight of the load on said weigh rail, said weight responsive means being supported by one of said first and second supporting means.

DETAILED DESCRIPTION OF THE PREFERRED EMBODIMENT

Figure 1:
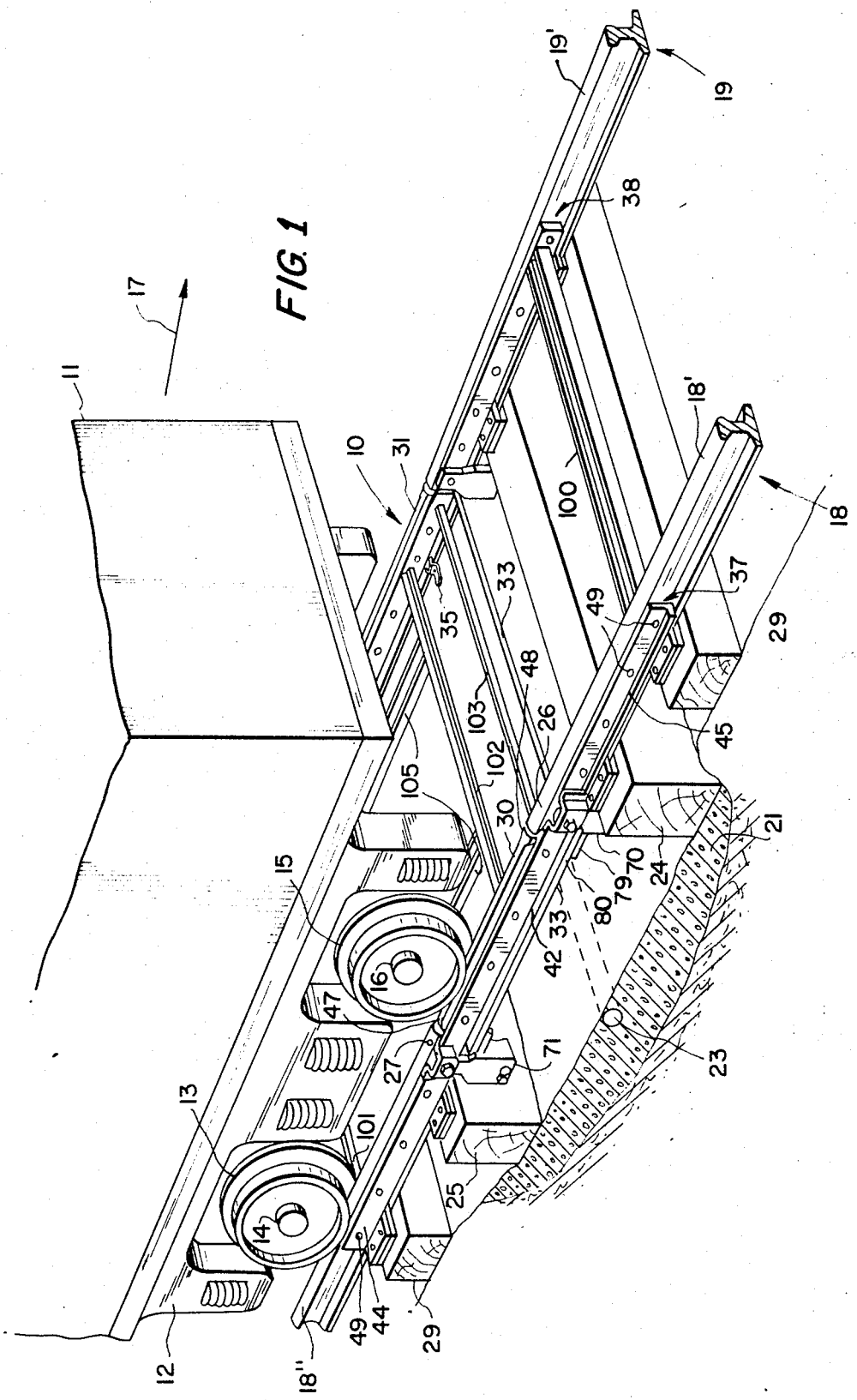
FIG. 1 is a perspective view of a track rail provided with a weighing apparatus according to the present invention.

Referring now to FIG. 1, a diagrammatic representation is shown of a weighing apparatus 10, for weighing railroad cars, constructed according to the invention. A railroad car 11, comprising a front two-axle truck 12 having rear wheels 13 mounted on common axle 14 and front wheels 15 mounted on common axle 16, is depicted moving in the direction of arrow 17 along a pair of parallel conventional elongate track rails 18 and 19. Track rail 18 comprises a first track rail section 18' and a second track rail section 18" longitudinally spaced therefrom and in longitudinal alignment therewith. Similarly, track rail 19 includes a first track rail section 19' and a second track rail section (not shown) arranged in the same fashion. Weighing apparatus 10 is disposed in each track rail in the space between the first and second track rail sections, the spaces being in transversely corresponding relation, whereby front wheels 15 on common axle 16 simultaneously transverse weighing apparatus 10.

The installation area of weighing apparatus 10 is also shown in FIG. 1. A gravel filled excavation 21 having a transverse drainage pipe 23 thereon is located below weighing apparatus 10 in order to ensure proper drainage of the area. Over-sized timbers 24 and 25, transversely located on top of gravel filled excavation 21 and longitudinally spaced on either side of pipe 23, respectively support overlapping end 26 of track rail section 18' and overlapping end 27 of track rail section 18''. In a similar manner, the track rail sections of track rail 19 are supported by timbers 24 and 25. A suggested size for timbers 24 and 25 is sixteen inches wide by ten inches high, it being understood that conventional railroad ties 29, also supporting track rails 18 and 19, are normally nine inches wide by seven inches high.

The installation area can also include a rough base upon which over-sized timbers 24 and 25 would be located. This base can be comprised of a number of conventional railroad ties, such as four or five ties similar to ties 29, located parallel to the track rails 18 and 19. This type of a base would provide a sturdy foundation upon which weighing apparatus 10 can be located.

Weighing apparatus 10 is comprised of a load bearing parallel elongate weigh rails 30 and 31 secured onto a rectangular platelike scale table 33 with conventional metal clips 35 in a mutually parallel longitudinal arrangement wherein the lateral spacing between weigh rails 30 and 31, commonly referred to as the track gauge, is equal to the track gauge of track rails 18 and 19. The advantage of having a weighing apparatus that is easily installable in any location in only a day's time is attained by using very short weigh rails 30 and 31 and by supporting them in a manner to be described from track rail sections 18' and 18'' and from the track rail sections of track rail 19 such that weigh rails 30 and 31 and track rails 18 and 19 are substantially at the same height. In one weighing apparatus according to the invention, weigh rails 30 and 31 are identical to track rail sections 18' and 18'' in cross section and are only two feet long thereby having a length that is less than the spacing between rear wheels 13 and front wheels 15 and restricting weighing apparatus 10 to the weighing of individual wheel loads. This is seen in FIG. 1 wherein car 11 is shown in position for the weighing of front wheels 15 of truck 12, whereas rear wheels 13 of truck 12 are supported by track rail section 18'' and the corresponding track rail section of rail 19.

Figure 3:
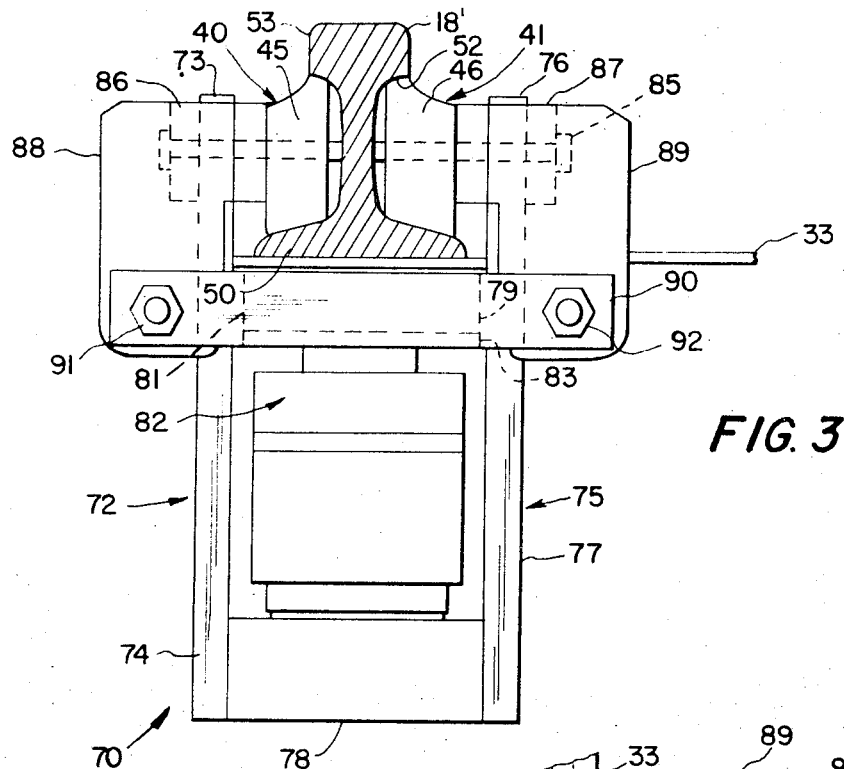
FIG. 3 is an end sectional elevation view taken along the lines 3—3 of FIG. 2.
Figure 4:
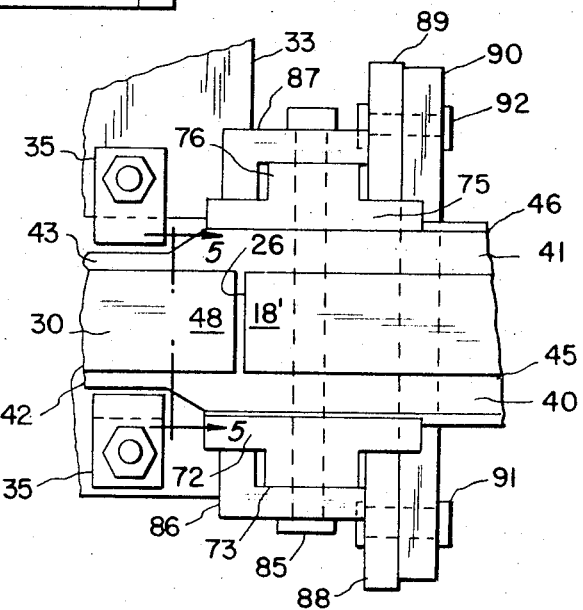
FIG. 4 is a plan view of a portion of FIG. 2 taken along lines 4—4 of FIG. 2.
Figure 5:
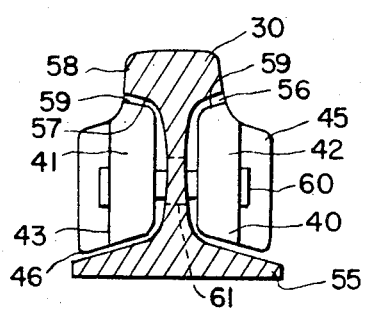
FIG. 5 is a sectional elevation view of a portion of FIG. 4 taken along lines 5—5 of FIG. 4.

Weigh rails 30 and 31 are respectively retained in longitudinal alignment with track rails 18 and 19 with elongate splice bars 37 and 38. Only splice bar 37 and its relationship to weigh rail 30 and track rail sections 18' and 18'' will be described, it being understood that splice bar 38 is similar in construction and attachment. Referring now also to FIGS. 3, 4 and 5, it is seen that splice bar 37 comprises two elongate splice bar sections 40 and 41 of equal length, one section located on each side of and abutting the longitudinally aligned combination of track rail section 18', weigh rail 30 and track rail section 18''. Splice bar section 40 comprises a smaller and thinner middle portion 42 and, integral with middle portion 42, higher and wider end portions 44 and 45. Splice bar section 40 is longitudinally located such that only middle portion 42 engages weigh rail 30. End portions 44 and 45 respectively extend longitudinally beyond ends 47 and 48 of weigh rail 30 and respectively overlap and are rigidly secured to track rail sections 18' and 18'' with bolts 49. Splice bar section 41, similar to splice bar section 40, comprises a middle portion 43, the integral end portion 46 and a corresponding second end portion (not shown) and is similarly longitudinally located and rigidly secured to track rail sections 18' and 18'' with bolts 49.

With reference to FIGS. 3 and 5, it will be seen that end portion 45 of splice bar section 40 engages track rail section 18' along the upper side of the base 50 and along the underside lip 52 of the tread 53, the other end portion 44 similarly engaging track rail section 18''. However, (see FIG. 5) middle portion 42 only engages weigh rail 30 along the upper side of the weigh rail base 55, leaving a gap 56 between the underside lip 57 of the weigh rail tread 58 and the top 59 of middle portion 42, thereby permitting limited vertical movement of weigh rail 30 resulting from the weight of the load thereon. Bolts 60 extend through vertically elongated slots 61 in weigh rail 30 and position middle portions 42 adjacent weigh rail 30, and slots 61 permit the aforementioned vertical movement. Splice bar section 41 similarly engages track rail sections 18' and 18'' and is bolted to and engages weigh rail 30.

Figure 2:
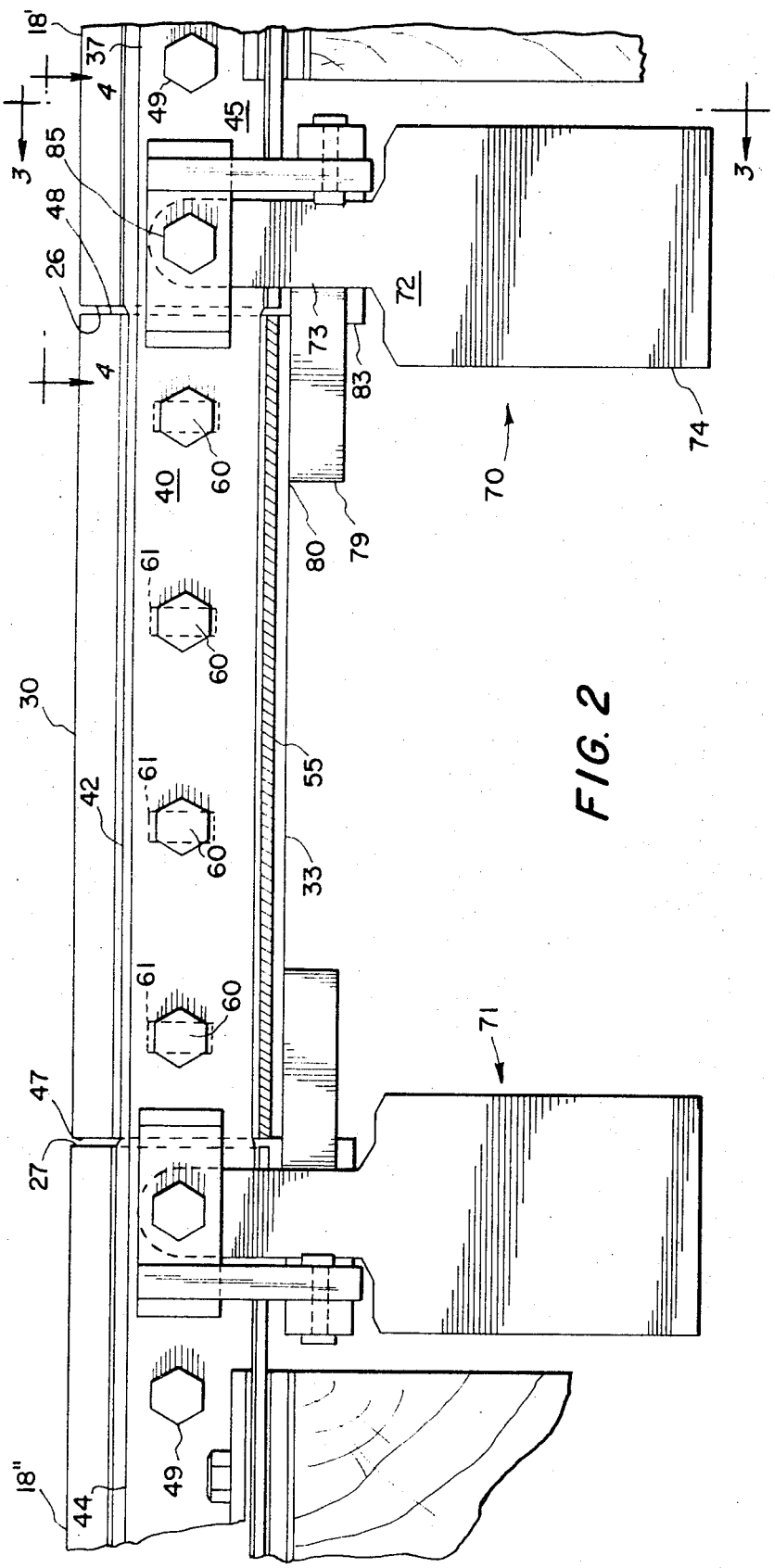
FIG. 2 is a front elevation of a weigh rail of FIG. 1 showing details of the support means for the weigh rail.

The means for supporting weigh rail 30, shown in FIGS. 2, 3 and 4, comprises support assemblies 70 and 71. Support assembly 70 supports end 48 of weigh rail 30, support assembly 70 being supported by end 26 of track rail section 18'. Support assembly 71 similarly supports end 47 of weigh rail 30, support assembly 71 being supported by end 27 of track rail section 18'''; weigh rail 30 being supported by support assemblies 70 and 71 in the aforementioned space between track rail sections 18' and 18''. Weigh rail 31 is similarly supported by similar support assemblies (not shown) in the aforementioned space between the track rail sections of track rail 19.

Only support assembly 70 will be described in further detail, it being understood that the other support assemblies are similar. Support assembly 70 is comprised of a paddle shaped front hanger plate 72 having handle end 73 and blade end 74; a paddle shaped rear hanger plate 75 having a handle end 76 and a blade end 77; a bottom plate 78 rigidly attached to, for example by welding, and connecting the bottom of front hanger plate 72 to the bottom of rear hanger plate 75; and an elongate member 79 secured, for example by welding, to the bottom 80 of scale table 30 and extending parallel to and outwardly from end 48 of weigh rail 30, elongate member 79 being ultimately supported at outer end 81 by a strain gauge load cell 82 which in turn is supported by bottom plate 78.

Support assembly 70 is supported from track rail section 18' essentially as follows. Front hanger plate 72 and rear hanger plate 75 of support assembly 70 upwardly engage the outer side of splice bar sections 40 and 41, respectively, near end 26 of track rail section 18' and are attached thereto with support bolt 85. Rigidity is provided to support assembly 70 by outer retainer bars 86 and 87 respectively located on the outer sides of handle ends 73 and 76 and are secured thereto with support bolt 85. Additional rigidity is provided to support assembly 70 by a retainer block assembly which comprises a front retainer block 88 and a rear retainer block 89, respectively engaging handle ends 73 and 76; and a transverse bar 90 extending laterally below track rail section 18' and respectively attached to the lower end of front retainer block 88 and the lower end of rear retainer block 89 with bolts 91 and 92.

As can best be seen from FIG. 3, the load cell support structure is comprised of load cell 82 supported by bottom plate 78 and includes a tempered bearing plate 83 interposed between the top of load cell 82 and outer end 81 of elongate member 79. Thus, load cell 82 receives the weight of the load on weigh rail 30 as a compressive force from elongate member 79 and transfers it to support assembly 70, which in turn transfers the weight to track rail section 18'. Responding to this compression, load cell 82 produces an output electrical signal, which is transmitted by wiring (not shown) to a conventional analysis unit (not shown). The treatment of the output electrical signal so as to provide the weight of the load is preferably accomplished in a manner and with an analyzing system such as described in U.S. Pat. No. 3,276,525 granted to one of the present coinventors, George Cass and the improvement thereto described in U.S. Pat. No. 3,545,555 also granted to George Cass.

There may also arise a need for strengthening and providing greater rigidity to the entire weighing apparatus. This can be accomplished, as shown in FIG. 1, by laterally interposing between the end portions of the inner splice bar sections of splice bars 37 and 38 one or more transverse stiffeners, such as transverse stiffeners 100 and 101, respectively located at each end of the weighing apparatus and extending laterally from splice bar 37 to splice bar 38. Also stiffeners, such as 102 and 103, can be located on scale table 33 and extend laterally from splice bar 37 to splice bar 38, thereby providing transverse rigidity to weigh rails 30 and 31. Longitudinal rigidity of the scale table 33 can be provided by longitudinally interposing between transverse stiffeners 101 and 102, one or more stay rods, illustrated by stay rods 105. The desired number and location of the transverse stiffeners and the stay rods can be easily determined by those skilled in the art and depends, for example, upon the track, the size and weight of the railroad cars, and the terrain, or location of the weighing apparatus.

Weighing apparatus 10 in FIG. 1 can be relatively easily and rapidly installed in any desired previously built section of track or installed when new track is lain. In either situation, an excavation that need measure only 10 feet long, 14 feet wide and 2 ½ feed deep is dug at the desired location and filled with gravel 21, approximately 8 cubic yards of gravel being required. Oversized timbers 24 and 25 are then positioned on top of gravel 21 and under the ends of track rails 18, 19, in a direction perpendicular to track rails, so as not to interfere with support assemblies 70 and 71. Weighing apparatus 10 can be preassembled elsewhere to the extent that all that is required at the installation site is the bolting of support assemblies 70 to track rail sections 18' and 18" and bolting splice bars 37 and 38 to weigh rails 30 and 31 and to track rail sections 18' and 18" and the bolting of support assemblies 70 to track rail sections 18 and 18", described above. The desired number of transverse stiffeners and stay rods are then welded into place and the electrical connections are made from load cell 82 to the analyzing system, not shown.

In operation, the railroad vehicles move at speeds up to three miles per hour, across weigh rails 30 and 31. As the wheels of each axle cross over weigh rails 30 and 31, a force exerted on weigh rails 30 and 31 that corresponds to the weight those wheels are supporting, is transferred to load cells 82. Load cells 82 produce an output electrical signal proportional to the load imposed upon them in a manner that is well known in the art. The summation of the output signals from all the load cells will represent the weight on weigh rails 30 and 31. The preferred method of producing and summing these signals, and of obtaining the total weight of a car 11 is described in aforementioned U.S. Pat. No. 3,545,555. If the weight of car 11 is obtained by that method, a minimum scale borne time of only approximately one second will be required.

Other modifications of the preferred embodiment are apparent to those skilled in the art. For example, the weight responsive means can be comprised of a tension sensing means which senses the increase in tension of supporting apparatus 70 corresponding to the weight of the load on weigh rails 30 and 31. The weight responsive means can also be comprised of a deflection sensing means that senses the downward deflection of weigh rails 30 and 31 corresponding to the weight of the load being supported thereon.

Whereas the weighing apparatus described in the preferred embodiment is one for weighing railroad cars, it is understood that with readily apparent modifications, the same principle can be used to construct a device for the weighing of any object which is being transported over either a one track rail or a two track rail system. Such objects can include animal carcasses, mail bags, mining carts and the like. If the weighing apparatus is to be used in a one track rail system, it is apparent that the weighing apparatus would utilize a single weigh rail. In such an embodiment, extension bars 79 can be rigidly attached directly to the bottom of the weigh rail 30.

From the description of the weighing apparatus, it should be readily apparent that the advantages of the invention include the fact that it can easily be installed, it can be installed along any desired section of track, it is relatively inexpensive because a concrete foundation is not required, and the weighing apparatus can be relocated at a minimum cost.

Although the invention has been described in detail with respect to an exemplary embodiment thereof, it will be understood by those of ordinary skill in the art that variations and modifications other than those described may be effected within the spirit and scope of the invention.

What is claimed is:

1. A weighing apparatus for weighing a load moveable along an elongate track rail, said elongate track rail including a first elongate track rail section and a second elongate track rail section longitudinally spaced therefrom and in longitudinal alignment therewith, said weighing apparatus comprising:
   a weigh rail interposable in said space in longitudinal alignment between said first and said second track rail sections;

first means for supporting a first end of said weigh rail said first supporting means being supported by the end of the first track rail section adjacent to said first end of the weigh rail;

second means for supporting the other end of said weigh rail said second supporting means supported by the end of the second track rail section adjacent to said other end of the weigh rail, said weigh rail being supported by said first and second support means in the space between said track rail sections;

means for retaining said weigh rail in longitudinal alignment with said track rail sections; and at least one weight responsive means responsive to the weight of the load on said weigh rail for providing a signal that is representative of the weight of the load on said weigh rail, said weight responsive means being supported by one of said first and second supporting means.

2. A weighing apparatus according to claim 1 wherein said retaining means is comprised of an elongate splice bar of a length longer than said weigh rail, said splice bar having two elongate sections of equal length, one section located on each side abutting said weigh rail in parallel longitudinal alignment therewith such that portions of said sections extend beyond each end of said weigh rail, said sections rigidly secured to said first and second elongate track rail sections at the portions extending beyond said weigh rail.

3. A weighing apparatus according to claim 1 wherein said first and second supporting means each comprises an elongate member secured to and extending outwardly from, respectively, an end of said weigh rail, said elongate member being supported at its outer ends from the end of the track rail section adjacent thereto.

4. A weighting apparatus according to claim 3 wherein said weight responsive means comprises first and second strain gauge load cells actuated by said elongate members.

5. A weighing apparatus according to claim 1 wherein the length of said weigh rail is less than the spacing between wheels of a load moving along said elongate track rail thereby restricting said weighing apparatus to the weighing of individual wheel loads.

6. A weighing apparatus according to claim 1 wherein said weighing apparatus is for weighing a load moveable along a laterally spaced pair of parallel elongate track rails, said weighing apparatus comprising a pair of said weigh rails, each said weigh rail associated with corresponding said first and second support means, said retaining means, and said weight responsive means, said spaces between said first and said second track rail sections of each elongate track rail being in transversely corresponding relation, whereby wheels on a common axle supporting a load moving along said track rails simultaneously transverse said pair of weigh rails.

7. A weighing apparatus according to claim 6 wherein said weighing apparatus is for weighing a load moveable along a laterally spaced pair of parallel elongate track rails, and further including:

a scale table interposable in the space between the first and second elongate track rail sections of said pair of track rails and having secured thereon said pair of weigh rails in a mutually parallel longitudinal arrangement wherein said weigh rails are spaced laterally an amount equal to the lateral track rail spacing, said scale table being positioned in vertical relationship to the pair of parallel elongate track rails by said first and second support means such that the load-supporting surfaces of said weigh rails and said parallel elongate track rails are substantially at the same height.

8. A weighing apparatus according to claim 6 wherein said weight responsive means comprises four strain gauge load cells, each said strain gauge load cell being respectively supported by one of said supporting means.

9. In a weighing apparatus for weighing a load moveable along an elongate track rail, the combination comprising:

a weigh rail interposed in a gap in said elongate track rail;

means for retaining said weigh rail in longitudinal alignment with the elongate track rail comprising an elongate splice bar of a length longer than said weigh rail, said splice bar having two elongate sections of equal length, one section located on each side abutting said weigh rail in parallel longitudinal alignment therewith such that portions of said sections extend beyond each end of said weigh rail, said sections rigidly secured to said first and said second elongate track rail sections at the portions extending beyond said weigh rail;

first means for supporting a first end of said weigh rail from the adjacent end of the elongate track rail;

second means for supporting the other end of said weigh rail from the adjacent end of the elongate track rail; said weigh rail being supported by said first and second support means in the gap in the elongate track rail such that said weigh rail is free from any additional supporting means along the length between said first supporting means and said second supporting means; and at least one weight responsive means responsive to the weight of the load on said weigh rail for providing a signal that is representative of the weight of the load on said weigh rail, said weight responsive means being supported by one of said supporting means.

10. In a weighing apparatus for weighing a load moveable along an elongate track rail, the combination comprising:

a weigh rail interposed in a gap in said elongate track rail;

means for retaining said weigh rail in longitudinal alignment with the elongate track rail;

first means for supporting a first end of said weigh rail from the adjacent end of the elongate track rail;

second means for supporting the other end of said weigh rail from the adjacent end of the elongate track rail; said weigh rail being supported by said first and second support means in the gap in the elongate track rail such that said weigh rail is free from any additional supporting means along the length between said first supporting means and said second supporting means;

at least one weight responsive means responsive to the weight of the load on said weigh rail for providing a signal that is representative of the weight of the load on said weigh rail, said weight responsive means being supported by one of said supporting means;

said first and second supporting means each comprising an elongate member secured to and extending outwardly from, respectively, an end of said weigh rail, said elongate member being supported at its outer ends from the end of the track rail section adjacent thereto.

11. A weighing apparatus according to claim 10 wherein said weight responsive means comprises first and second strain gauge load cells actuated by said elongate members.

* * * * *